United States Patent

[11] 3,622,605

[72] Inventors Koene De Jong;
Bastiaan Van der Ven, both of Vlaardingen, Netherlands
[21] Appl. No. 808,356
[22] Filed Mar. 18, 1969
[45] Patented Nov. 23, 1971
[73] Assignee Lever Brothers Company
New York, N.Y.
[32] Priority Mar. 21, 1968
[33] Great Britain
[31] 13776/68

[54] PROCESS FOR PREPARING HYDROXYCARBOXYLIC ACID ESTERS
15 Claims, No Drawings
[52] U.S. Cl. .................................................. 260/410.6,
260/410.7
[51] Int. Cl. .................................................. C11c 3/02
[50] Field of Search ........................................ 260/410.6,
410.7

[56] References Cited
FOREIGN PATENTS
620,236   5/1961   Canada ........................   260/410.7

Primary Examiner—Lewis Gotts
Assistant Examiner—Ethel G. Love
Attorneys—Louis F. Kline, Jr., Melvin H. Kurtz and Edgar E. Ruff ABSTRACT: Aliphatic δ-hydroxy carboxylic acid esters, for instance δ-hydroxydecanoic and -dodecanoic glycerides, which are flavoring agents for fatty foodstuffs, are prepared by the acid-catalysed reaction of a δ-lactone with a polyhydric alcohol until at least 80 percent of the ester present at equilibrium in the esterification reaction has been formed, and removal of acid catalyst before 10 percent of lactone polymer is formed.

PROCESS FOR PREPARING HYDROXYCARBOXYLIC ACID ESTERS

This invention relates to a process for preparing esters of polyhydric alcohols and δ-hydroxy carboxylic acids.

British Pat. No. 748,645 describes the use of lactones of aliphatic δ-hydroxy carboxylic acids, for example δ-hydroxydecanoic acid, for imparting a butter-like flavor to oleaginous foodstuffs. Butter fat contains small amounts of such lactones, which arise by the degradation of δ-hydroxyacid glycerides. These glycerides are, as described in British Pat. No. 797,134, also useful for flavoring oleaginous foodstuffs on account of the lactone they form when they break down in foodstuffs on storage or on heating, or in the mouth during consumption. British Pat. No. 797,134 describes the preparation of such glycerides by methods which include the esterification of δ-dodecalactone with glycerol by heating under both acid and alkaline conditions, by a reversal of the degradation process.

Investigation has shown that such a glyceride is in a delicate equilibrium with the free lactone and glycerol, that reaction does not go to completion and that any attempt to purify the ester by removal of the starting materials is liable to result in disturbance of the equilibrium and degradation of the glyceride until a new equilibrium is established. Moreover it has been found that when acid conditions, especially those described in British Pat. No. 797,134, are employed, polymerization of the lactone is promoted. Not only is there a lower conversion to ester, but the lactone polymer formed represents a loss of the lactone flavor values, for it has no useful flavoring property and is difficult if not impossible to remove from the product. Further investigation of the process of example 1 of British Pat. No. 797,134 using sulfuric acid has shown that the product actually contains 45 percent of lactone polymer. On the other hand, although when alkaline conditions are used there is no interference by lactone polymerization, there is a conversion to ester of the order of only 55 percent.

It has now been discovered that the esterification under acid conditions attains equilibrium very much more rapidly than polymerization occurs and that if the acid catalyst is removed as soon as equilibrium is reached and before polymerization has advanced further, good conversions of ester with very little polymer can be obtained. It has moreover been discovered that when all or part of the lactone used is in the optically active form the course of the reaction can be followed by polarimetry, for while the optical rotation of the lactone is large, that of the ester is negligible, as also is that of the polymer, and progress towards equilibrium can be followed rapidly, thus enabling the time taken to reach equilibrium and the extent of conversion at any stage to be determined.

A process of this invention is one for the preparation of aliphatic δ-hydroxy carboxylic acid esters, in which a lactone monomer of an aliphatic δ-hydroxy carboxylic acid and a polyhydric alcohol are contacted in the presence of an acid catalyst until at least 80 percent of the amount of ester present at equilibrium has been formed, and the acid catalyst is removed before 10 percent of lactone polymer by total weight of lactone monomer, polymer and ester is formed.

Preferably contact is maintained until the esterification reaction is substantially at equilibrium, and preferably the acid catalyst is removed before 5 percent, and especially before 2 percent, of lactone polymer is formed.

It has been found that the esterification reaction proceeds with an acid catalyst at much lower temperatures than has hitherto been considered necessary. At temperatures of about 100° C. both the attainment of equilibrium and polymerization are too fast for a practicable process, and preferably the temperature of the reaction mixture does not exceed 70° C., or better still 50° C. Excellent results can be obtained by conducting the reaction at room temperature, when the rate of polymerization of the lactone is very small.

The lactone is in practice one of from 6 to 24, and preferably from 6 to 12, carbon atoms in the molecule, especially one from a straight chain hydroxyacid: for instance the lactone can be δ-decalactone, δ-dodecalactone, δ-octalactone, or δ-hexalactone: the dextrorotatory (+) optically active form is preferable.

Suitable polyhydric alcohols are those with from two to six carbon atoms, for instance ethylene glycol, propane-1,3-diol, mannitol, sorbitol or erythritol, but preferably the polyhydric alcohol has two or three carbon atoms: glycerol is especially suitable.

The relative molecular proportions of lactone monomer and polyhydric alcohol are in practice between 0.3 and 1.2 of lactone to 1 of polyhydric alcohol, as excess polyhydric alcohol can be removed after reaction by washing with brine. Preferably substantially equimolecular quantities of the reagents are used.

As acid catalysts there can be used, for example, sulfuric, hydrochloric, phosphoric and perchloric acids, but preferably an arylsulphonic acid, for instance toluene-p-sulfonic acid is used. Suitable catalytic amounts of acid are from 0.1 to 5 percent by weight of the initial reactants. The use of solvents or diluents in the reaction is preferably avoided.

The time taken for the reaction to go to equilibrium will depend upon the reagents and conditions chosen, but equilibrium is usually attained within 2 hours at room temperature.

The acid catalyst can be removed from the reaction mixture by dissolving the latter in a water-immiscible organic solvent and washing the solution with from 10 percent to 20 percent brine, which also removes the unreacted polyhydric alcohol. Ether is a suitable solvent; benzene and ethyl acetate can also be used. Alternatively the acid catalyst can be removed by neutralization and the salt formed separated from the reaction products, for instance using a basic ion-exchange resin. The catalyst can be removed by neutralization with other suitable bases, for instance an alkali metal or alkaline earth metal oxide, hydroxide, carbonate or bicarbonate, and the salt formed filtered off if desired. Thus when sodium bicarbonate is added to a reaction mixture containing sulfuric acid as catalyst, both the sodium sulfate formed and excess bicarbonate can be filtered off.

The invention is illustrated by the following examples.

EXAMPLES 1 to 3

(+)-δ-Decalactone (21.2 g., 0.125 mol, $[\alpha]_D+57.2°$), glycerol (11.5 g., 0.125 mol) and toluene-p-sulfonic acid monohydrate (0.3 g., 1 percent) were mixed together at room temperature. The initial turbidity soon disappeared and a clear solution was formed, which was divided into three equal portions. After 1½, 2½ and 7 hours from mixing, respectively, the three portions of the product were dissolved in ether (80 ml.) and the solution washed with 20 percent aqueous sodium chloride solution (3×5 ml.) in order to remove catalyst and unreacted glycerol, dried over anhydrous sodium sulfate and the ether removed by evaporation to give (+)-δ-hydroxydecanoic acid glyceride.

The specific optical rotation of the product was measured in benzene and the content of unchanged lactone monomer was determined from it on the basis that the glyceride has a negligible specific rotation.

A portion of the product was submitted to distillation at bath temperatures increasing from 120° to 190° C. and under a reduced pressure of 15 mm. mercury; the lactone and glycerol in the distillation product were separated by extraction with light petroleum, and the amount of lactone converted to ester in the preparation of the latter was determined by subtracting the amount of lactone monomer found in the ester by polarimetry from the total amount of lactone monomer recovered by distillation and separation. The weight of residue in the distillation flask was taken as the amount of lactone polymer present in the sample of product distilled.

The results were as follows:

| Example number | Reaction time, hr. | Glyceride | Lactone Monomer | Lactone Polymer |
|---|---|---|---|---|
| 1 | 1½ | 77.7 | 22.1 | 0.2 |
| 2 | 2½ | 78.3 | 21.2 | 0.5 |
| 3 | 7 | 78.5 | 17.1 | 4.4 |

These results show that the maximum conversion to glyceride is achieved in between 1½ and 2½ hours and before a substantial amount of polymer is formed, after which there is only an increase in the lactone polymer at the expense of residual monomer.

The three products were stored in the dark for 2 months and their constituents again determined. It was found that the amount of lactone polymer had not increased, and the amount of free lactone had increased by about 1 percent to 2 percent.

EXAMPLES 4 TO 6

A process was carried out similar to that described in examples 1 to 3, except that the lactone used was (+)-δ-dodecalactone (24.8 g., 0.125 mol, $[\alpha]_D 48.8°$) and the reaction times were 2, 3 and 7 hours. The products were similarly analyzed, with the following results:

| Example number | Reaction time, hr. | Glyceride | Lactone Monomer | Lactone Polymer |
|---|---|---|---|---|
| 4 | 2 | 73 | 26 | 1 |
| 5 | 3 | 74.5 | 23.5 | 2 |
| 6 | 7 | 73 | 22 | 5 |

Maximum conversion was apparently attained after 3 hours, at which stage the proportion of polymer remained low.

Tests after storage as before showed the products to be as stable as those of examples 1 to 3.

EXAMPLES 7 TO 11

Processes similar to those of examples 1 to 3 were carried out, but using different acid catalysts. The products were analyzed as before.

| Ex. No. | Catalyst | Reaction time, hr. | Glyceride | Lactone Monomer | Lactone Polymer |
|---|---|---|---|---|---|
| 7 | Sulphuric acid 1% | 1½ | 69.2 | 25.7 | 5.1 |
| 8 | Sulphuric acid 1% | 2½ | 68.0 | 22.3 | 9.7 |
|   | Sulphuric acid 1% | 7 | 64.1 | 19.0 | 16.9 |
| 9 | Hydrochloric acid 0.5% | 1½ | 72.4 | 22.6 | 5.0 |
| 10 | Hydrochloric acid 0.5% | 2½ | 72.2 | 20.3 | 7.5 |
|   | Hydrochloric acid 0.5% | 7 | 66.7 | 16.8 | 16.5 |
| 11 | Perchloric acid 0.2% | 2 | 74.8 | 23.1 | 2.1 |

EXAMPLES 12 AND 13

(+)-δ-Decalactone (21.2 g., 0.125 mol), glycerol (11.5 g., 0.125 mol) and toluene-p-sulfonic acid monohydrate (0.3 g., 1 percent) were mixed together at room temperature. After 2 hours the product was dissolved in benzene (150 ml.) and the solution washed with 20 percent aqueous sodium chloride (3×15 ml.), dried over anhydrous sodium sulfate and solvent removed by evaporation. The process was repeated using ethyl acetate (150 ml.) as solvent instead of benzene. The products were analyzed as before.

| Example No. | Solvent | Glyceride | Lactone Monomer | Lactone Polymer |
|---|---|---|---|---|
| 12 | Benzene | 63.5 | 36 | <0.5 |
| 13 | Ethyl acetate | 67.5 | 32 | <0.5 |

The lower yields of glyceride as compared with when ether was used are apparently due to slight emulsification requiring a longer time for removal of the catalyst, which causes partial hydrolysis of the glyceride in the presence of water.

EXAMPLE 14

(+)-δ-Octalactone (35.5 g., 0.25 mol), glycerol (23.0 g., 0.25 mol) and toluene-p-sulfonic acid (0.2 g.) were mixed together at room temperature. After standing for 2 hours the reaction product was dissolved in ether (400 ml.) and the catalyst and unreacted glycerol removed by washing with 10 percent aqueous sodium chloride (3×15 ml.); the combined washings were reextracted with one portion of ether (50 ml.) and the combined ether solutions dried over anhydrous sodium sulfate, and the ether removed by evaporation, to give a product found by analysis as before to consist of:

| | |
|---|---|
| (+)-δ-Hydroxydecanoic acid glyceride | 77% |
| (+)-δ-Octalactone | 22% |
| Lactone polymer | 1% |

EXAMPLE 15

(+)-δ-Hexalactone (14.25 g., 0.125 mol), glycerol (11.5 g., 0.125 mol), and toluene-p-sulfonic acid (0.1 g.) were mixed together at room temperature. After standing for 1½ hours the reaction product was dissolved in ethyl acetate (200 ml.), a basic ion-exchange resin (5 g., the material sold under the trade name Amberlite IRA 400) which had been treated with water (1 ml.) was added to the solution shaken to absorb the catalyst on to the resin, and dried over anhydrous sodium sulfate. The solution was finally filtered and the solvent removed from the filtrate by evaporation.

The resulting product (20.2 g.) was analyzed as before: it was found to have the following composition:

| | |
|---|---|
| (+)-δ-Hydroxyhexanoic acid glyceride } Glycerol | 89.3% |
| (+)-δ-Hexalactone | 10% |
| Lactone polymer | 0.7% |

EXAMPLES 16 and 17

Processes similar to those of example 1 were carried out, but using different reaction temperatures and times as shown in the following table. The products were analyzed as before.

| Example No. | Reaction Time, hr. | Reaction Temperature, °C. | Glyceride | Lactone Monomer | Lactone Polymer |
|---|---|---|---|---|---|
| 16 | 2 | 20 | 79.6 | 20 | 0.4 |
| 17 | 1½ | 40 | 76.0 | 20.5 | 3.5 |
|    | 1 | 60 | 70.8 | 18.9 | 10.3 |

EXAMPLE 18

(+)-δ-Dodecalactone (24.75 g., 0.125 mol), glycol (7.75 g., 0.125 mol) and toluene-p-sulfonic acid (0.1 g.) were mixed together at room temperature, the initial turbidity disappearing at once and a clear solution being obtained. The optical rotation of the mixture rapidly decreased, indicating a fast reaction. After 20 minutes the reaction mixture was dissolved in ether (150 ml.) and the catalyst and excess glycol were removed by washing with 10 percent aqueous sodium chloride solution (3×15 ml.), dried with anhydrous sodium sulfate, and the solvent evaporated. The product (29.2 g.) was analyzed as before and found to consist of

| | |
|---|---|
| (+)-δ-Hydroxydodecanoic acid glycol ester | 72.5% |
| (+)-δ-Dodecalactone | 25.0% |
| Lactone polymer | 2.5% |

EXAMPLE 19

(+)-δ-Decalactone (21.25 g., 0.125 mol), glycol (7.75 g., 0.125 mol) and toluene-p-sulfonic acid (0.1 g.) were mixed together at room temperature. After 10 minutes the reaction mixture was dissolved in ether (150 ml.), the solution washed with 10 percent aqueous sodium chloride solution (4×15 ml.), dried with anhydrous sodium sulfate and the solvent evaporated. The product (25.7 g.) was analyzed and found to consist of

| | |
|---|---|
| (+)-δ-Hydroxydecanoic acid glycol ester | 76.2% |
| (+)-δ-Decalactone | 22.7% |
| Lactone polymer | 1.1% |

EXAMPLE 20

(+)δ-Hexalactone (57 g., 0.5 mol), glycerol (46 g., 0.5 mol), and concentrated sulfuric acid (125 mg.) were mixed together at room temperature. After 45 minutes powdered sodium bicarbonate (1.3 g.) was added, and the mixture was then stirred for 2 hours. The reaction product was filtered to remove sodium sulfate, yielding product (100 g.) consisting of

| | |
|---|---|
| (+)-δ-Hydroxyhexanoic acid glyceride } Glycerol | 90% |
| (+)-δ-Hexalactone | 9% |
| Lactone polymer | 0.5% |

The product contained 46 g. of lactone as glycerol ester.

EXAMPLE 21

(+)-δ-Decalactone (42.5 g., 0.25 mol), propane-1,3-diol (19.0 g., 0.25 mol) and toluene-p-sulfonic acid (0.3 g.) were mixed with stirring at room temperature. The initial turbidity disappeared almost immediately, and the optical rotation of the mixture decreased rapidly to about 12 percent of its initial value in 20 minutes. The catalyst was then removed as described in examples 1 to 3, leaving product (56 g.) consisting of

| | |
|---|---|
| (+)-δ-Hydroxydecanoic acid propane-1,3-diol ester | 86.5% |
| (+)-δ-Decalactone | 12.5% |
| Lactone polymer | 1% |

EXAMPLE 22

(+)-δ-Dodecalactone (24.75 g., 0.125 mol), propane-1,3-diol (9.5 g., 0.125 mol) and toluene-p-sulfonic acid (170 mg.) were mixed with stirring at room temperature. After 40 minutes the reaction product (31 g.), isolated as described in examples 1-hydroxydodecanoic 3, consisted of

| | |
|---|---|
| (+)-δ-Hydroxydodecanoic acid propane-1,3-diol ester | 87.5% |
| (+)-δ-Dodecalactone | 12% |
| Lactone polymer | 0.5% |

EXAMPLES 23 and 24

Glycol esters were prepared and (+24-decalactone and (+)-δ-dodecalactone using concentrated sulfuric acid as catalyst at room temperature, and removing the catalyst as described in example 20. The amounts of reagents, reaction time and products were as follows:

| Example No. | 23 | 24 |
|---|---|---|
| (+)-δ-Decalactone | 42.5 g. | |
| (+)-δ-Dodecalactone | | 49.5 g. |
| Ethylene Glycol | 15.5 g. | 15.5 g. |
| Sulfuric acid | 75 mg. | 100 mg. |
| Reaction time | 10 min. | 20 min. |
| Sodium bicarbonate | 0.75 g. | 1.0 g. |
| Reaction product | 56 g. | 63 g. |
| consisting of (in % by weight) | | |
| Ester } Glycol | 79% | 79.5% |
| δ-Lactone | 20% | 20% |
| Lactone polymer | 1% | 0.5% |
| Amount of lactone in Product as glycol ester | 29 g. | 34 g. |

What is claimed is:

1. A process for the preparation of aliphatic δ-hydroxy carboxylic acid esters, in which a lactone monomer of an aliphatic δ-hydroxy carboxylic acid and a polyhydric alcohol are contacted in the presence of an acid catalyst and maintained at a temperature not in excess of 70° C. until at least 80 percent of the amount of ester present at equilibrium has been formed, and the acid catalyst is removed before 10 percent of lactone polymer by total weight of lactone monomer, polymer and ester is formed.

2. A process according to claim 1, in which contact is maintained until the esterification reaction is substantially at equilibrium, and the acid catalyst is removed before 5 percent of lactone polymer is formed.

3. A process according to claim 2, in which the acid catalyst is removed before 2 percent of lactone polymer is formed.

4. A process according to claim 1, in which the lactone monomer is optically active.

5. A process according to claim 1, in which the reaction is conducted at room temperature.

6. A process according to claim 1, in which the lactone monomer is one from a straight chain hydroxyacid of from six to 12 carbon atoms and the polyhydric alcohol has from two to three carbon atoms.

7. A process according to claim 1, in which the polyhydric alcohol is glycerol.

8. A process according to claim 1, in which the polyhydric alcohol is ethylene glycol.

9. A process according to claim 1, in which the lactone monomer is δ-decalactone or δ-dodecalactone.

10. A process according to claim 9, in which the polyhydric alcohol is glycerol.

11. A process according to claim 1, in which the acid catalyst is sulfuric acid.

12. A process according to claim 1, in which the acid catalyst is an arysulfonic acid.

13. A process according to claim 12, in which the acid catalyst is toluene-p-sulfonic acid.

14. A process according to claim 1, in which the acid catalyst is removed by neutralization.

15. A process according to claim 1, in which equimolecular amounts of lactone monomer and polyhydric alcohol are employed.

* * * * *